US011538277B2

(12) United States Patent
Kang et al.

(10) Patent No.: US 11,538,277 B2
(45) Date of Patent: Dec. 27, 2022

(54) IMAGE PROCESSING METHOD AND APPARATUS

(71) Applicant: SAMSUNG ELECTRONICS CO., LTD., Suwon-si (KR)

(72) Inventors: Dongwoo Kang, Seoul (KR); Jingu Heo, Yongin-si (KR); Byong Min Kang, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 172 days.

(21) Appl. No.: 17/146,660

(22) Filed: Jan. 12, 2021

(65) Prior Publication Data
US 2021/0133431 A1 May 6, 2021

Related U.S. Application Data

(63) Continuation of application No. 16/416,389, filed on May 20, 2019, now Pat. No. 10,915,736.

(30) Foreign Application Priority Data

Dec. 4, 2018 (KR) .................. 10-2018-0154351

(51) Int. Cl.
G06V 40/16 (2022.01)
G06V 40/18 (2022.01)
G06T 7/33 (2017.01)

(52) U.S. Cl.
CPC .............. G06V 40/171 (2022.01); G06T 7/33 (2017.01); G06V 40/166 (2022.01);
(Continued)

(58) Field of Classification Search
CPC .... G06T 7/30; G06T 7/33; G06T 7/70; G06T 7/73; G06T 2207/30201; G06V 10/40;
(Continued)

(56) References Cited

U.S. PATENT DOCUMENTS 7,103,218 B2  9/2006 Chen et al. ............. 382/170
9,959,678 B2  5/2018 Katz et al. ............. G06T 19/006
(Continued)

FOREIGN PATENT DOCUMENTS

KR  10-2013-0067465 A  6/2013 ............... G06T 7/20
KR  10-2013-0099521 A  9/2013 ............... G06T 7/00
(Continued)

OTHER PUBLICATIONS

Communication dated May 12, 2020, issued by the European Patent Office in counterpart European Application No. 19211797.6.

*Primary Examiner* — Andrew W Johns
(74) *Attorney, Agent, or Firm* — Sughrue Mion, PLLC

(57) ABSTRACT

An image processing method includes receiving an image frame, detecting a face region of a user in the image frame, aligning a plurality of preset feature points in a plurality of feature portions included in the face region, performing a first check on a result of the aligning based on a first region corresponding to a combination of the feature portions, performing a second check on the result of the aligning based on a second region corresponding to an individual feature portion of the feature portions, redetecting a face region based on a determination of a failure in passing at least one of the first check or the second check, and outputting information on the face region based on a determination of a success in passing the first check and the second check.

13 Claims, 7 Drawing Sheets

(52) U.S. Cl.
CPC .......... *G06V 40/167* (2022.01); *G06V 40/193* (2022.01); *G06T 2207/10024* (2013.01); *G06T 2207/10048* (2013.01); *G06T 2207/30201* (2013.01)

(58) Field of Classification Search
CPC ...... G06V 10/44; G06V 10/457; G06V 10/98; G06V 10/993; G06V 40/161; G06V 40/165; G06V 40/168; G06V 40/171; G06V 40/193
See application file for complete search history.

(56) References Cited

U.S. PATENT DOCUMENTS

| | | | |
|---|---|---|---|
| 10,915,736 B2 * | 2/2021 | Kang et al. | G06T 7/33 |
| 2003/0190060 A1 | 10/2003 | Pengwu | 382/118 |
| 2010/0303294 A1 | 12/2010 | Zschau | 382/103 |
| 2014/0270490 A1 | 9/2014 | Wus et al. | G06K 9/00234 |
| 2016/0196465 A1 | 7/2016 | Wu et al. | G06K 9/0061 |
| 2018/0098057 A1 | 4/2018 | Heo et al. | H04N 13/0484 |
| 2019/0129165 A1 | 5/2019 | Kang et al. | G02B 27/0093 |
| 2019/0197331 A1 | 6/2019 | Kwak et al. | G06F 16/00 |

FOREIGN PATENT DOCUMENTS

| | | | |
|---|---|---|---|
| KR | 10-2015-0064977 A | 6/2015 | G06T 7/00 |
| KR | 10-1610525 B1 | 4/2016 | G06T 7/00 |
| KR | 10-2016-0127264 A | 11/2016 | G06K 9/00604 |
| KR | 10-2017-0054183 A | 5/2017 | G06F 3/013 |
| KR | 10-1819164 B1 | 1/2018 | H04N 13/0484 |
| KR | 10-2018-0014317 A | 2/2018 | G06F 21/32 |
| WO | 2016131075 A1 | 8/2019 | G06T 7/00 |

* cited by examiner

Face checker: 11 points

Face (o), Alignment (o)     Face (o), Alignment (x)

Eye checker: 3 points

Eye (o), Alignment (o)     Eye (x), Alignment (x)

IMAGE PROCESSING METHOD AND APPARATUS

CROSS-REFERENCE TO RELATED APPLICATION

This application is a Continuation of U.S. patent application Ser. No. 16/416,389, filed May 20, 2019, which is based on and claims priority from Korean Patent Application No. 10-2018-0154351 filed on Dec. 4, 2018, in the Korean Intellectual Property Office, the disclosure of which is incorporated herein by reference in its entirety.

BACKGROUND

1. Field

Methods and apparatuses consistent with example embodiments relate to an image processing method and apparatus.

2. Description of Related Art

A camera-based eye tracking technology, for example, a viewpoint tracking-based autostereoscopic or glassless three-dimensional (3D) super-multiview (SMV) display, and the like, is used in various fields. A level of performance of the eye tracking technology is determined based on a quality of an image captured by a camera used. The eye tracking technology may exhibit a deteriorating operational stability under some conditions, for example, in an environment with a backlight or a strong sunlight, in a dark or low-illumination environment, and in a drastically changing illumination environment, for example, when a vehicle passes through a tunnel, during actual driving. Thus, there is a need for an eye tracking method that may stably operate under various illumination conditions during an actual use of an augmented reality (AR) 3D head-up display (HUD), for example, during vehicle driving. A stability and accuracy of the eye tracking method may be degraded because, when a user wears eyeglasses, eyes of the user may be affected by a reflection at lenses of the eyeglasses caused by an infrared (IR) light source and a strong sunlight.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

According to an aspect of the disclosure, there is provided an image processing method comprising: receiving an image frame; detecting a face region of a user in the image frame; aligning a plurality of preset feature points in a plurality of feature portions included in the face region; performing a first check on a result of the aligning based on a first region corresponding to a combination of the feature portions; performing a second check on the result of the aligning based on a second region corresponding to an individual feature portion of the feature portions; redetecting a face region based on a determination of a failure in at least one of the first check operation or the second check operation; and outputting information on the face region based on a determination of a success in both the first check operation or the second check operation.

The detecting the face region may comprise: detecting the face region of the user included in the image frame when the image frame being an initial image frame; and receiving the face region detected based on one of previous image frames of the image frame when the image frame is not the initial image frame.

The aligning may comprise: aligning the plurality of preset feature points in the plurality of feature portions included in the face region and a surrounding region of the face region.

The aligning may comprise: moving the plurality of preset feature points based on image information of the face region.

When the image frame is an initial image frame, the plurality of preset feature points before being aligned may correspond to average positions of feature portions of users.

When the image frame is not an initial image frame, the plurality of preset feature points before being aligned may correspond to points aligned based on a previous image frame.

The combination of the feature portions may include eyes and a nose of the user, and the individual feature portion includes the eyes of the user.

The performing of the first check may comprise: determining whether the first region includes the combination of the feature portions based on image information of the first region.

The performing of the first check may comprise: determining whether the first region corresponds to a class corresponding to the combination of the feature portions based on image information of the first region.

The performing of the second check may comprise: determining whether the second region corresponds to the individual feature portion based on image information of the second region.

The performing of the second check may comprise: determining whether the second region corresponds to a class corresponding to the individual feature portion based on image information of the second region.

The outputting of the information on the face region may comprise: outputting information on at least one of a position of a pupil included in the face region, a viewpoint based on the position of the pupil, or a facial expression in the face region.

The image processing method may further comprise: repetitively performing the aligning operation, the first check operation, and the second check operation on the redetected face region.

The image frame may include at least one of a color image frame or an infrared (IR) image frame.

A non-transitory computer-readable storage medium may store instructions that are executable by a processor to perform the image processing method described above.

According to another aspect of the disclosure, there is provided an image processing apparatus comprising: a processor configured to: detect a face region of a user in an image frame, align a plurality of preset feature points in a plurality of feature portions included in the face region, perform a first check on a result of the aligning based on a first region corresponding to a combination of the feature portions, perform a second check on the result of the aligning based on a second region corresponding to an individual feature portion of the feature portions, and redetect a face region based on a determination of a failure in at least one of the first check operation or the second check operation; and a communication interface configured to receive the image frame, and output information on the face region based on a determination of a success in both the first check operation or the second check operation.

The processor may be further configured to: detect the face region of the user included in the image frame when the image frame being an initial image frame; and receive the face region detected based on one of previous image frames of the image frame when the image frame is not the initial image frame.

The processor may be further configured to: align the plurality of preset feature points in the plurality of feature portions included in the face region and a surrounding region of the face region.

The processor may be further configured to: move the plurality of preset feature points based on image information of the face region.

When the image frame is an initial image frame, the plurality of preset feature points before being aligned may correspond to average positions of feature portions of users.

When the image frame is not an initial image frame, the plurality of preset feature points before being aligned may correspond to points aligned based on a previous image frame.

The combination of the feature portions may include eyes and a nose of the user, and the individual feature portion includes the eyes of the user.

The processor may be further configured to: determine whether the first region includes the combination of the feature portions based on image information of the first region.

The processor may be further configured to: determine whether the first region corresponds to a class corresponding to the combination of the feature portions based on image information of the first region.

The processor may be further configured to: determine whether the second region corresponds to the individual feature portion based on image information of the second region.

The processor may be further configured to: determine whether the second region corresponds to a class corresponding to the individual feature portion based on image information of the second region.

The communication interface may be further configured to: output information on at least one of a position of a pupil included in the face region, a viewpoint based on the position of the pupil, or a facial expression in the face region.

The processor may be further configured to: repetitively perform the aligning, the first check, and the second check on the redetected face region.

The image frame may include at least one of a color image frame or an infrared (IR) image frame.

According to another aspect of the disclosure, there is provided an image processing apparatus comprising: a memory configured to store one or more instructions; and a processor configured to execute the one or more instructions to: detect a face region of a user in an image frame, determine whether a combination of a plurality of feature portions in a first region satisfies a first criterion, determine whether one or more of the plurality of feature portions individually satisfies a second criterion, redetect a face region based on a determination that the combination of the plurality of feature portions in the first region does not satisfy the first criterion or the one or more of the plurality of feature portions does not individually satisfy the second criterion; and output information on the face region based on a determination that the combination of the plurality of feature portions in the first region satisfies the first criterion and the one or more of the plurality of feature portions individually satisfies the second criterion.

The first criterion may correspond to characteristics of a face.

The second criterion may correspond to characteristics of an eye.

According to another aspect of the disclosure, there is provided an image processing method comprising: detecting a face region of a user in an image frame; determining whether a combination of a plurality of feature portions in a first region satisfies a first criterion; determining whether one or more of the plurality of feature portions individually satisfies a second criterion; redetecting a face region based on a determination that the combination of the plurality of feature portions in the first region does not satisfy the first criterion or the one or more of the plurality of feature portions does not individually satisfy the second criterion; and outputting information on the face region based on a determination that the combination of the plurality of feature portions in the first region satisfies the first criterion and the one or more of the plurality of feature portions individually satisfies the second criterion.

The first criterion may correspond to characteristics of a face.

The second criterion may correspond to characteristics of an eye.

BRIEF DESCRIPTION OF THE DRAWINGS

The above and/or other aspects will be more apparent by describing certain example embodiments, taken in conjunction with the accompanying drawings, in which.

DETAILED DESCRIPTION

Figure 1:
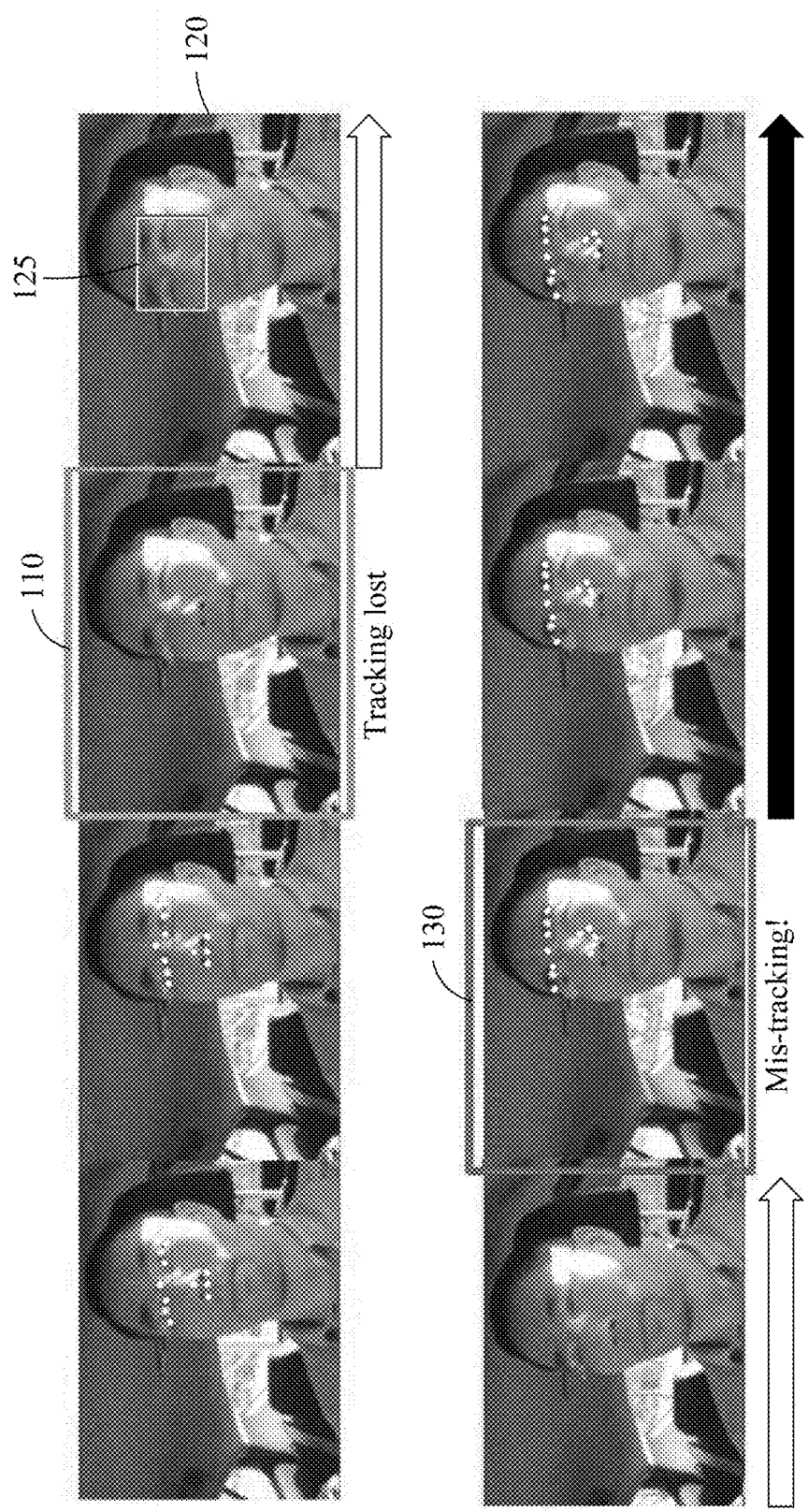
FIG. 1 is a diagram illustrating an example of erroneous eye tracking.

Reference will now be made in detail to example embodiments, examples of which are illustrated in the accompanying drawings, wherein like reference numerals refer to the like elements throughout.

The following structural or functional descriptions are exemplary to merely describe the example embodiments, and the scope of the example embodiments is not limited to the descriptions provided in the disclosure. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the example embodiments of the disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises," "comprising," "includes," and/or "including," when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Example embodiments to be described hereinafter may be applicable to, for example, an autostereoscopic or glassless three-dimensional (3D) monitor, an autostereoscopic or glassless 3D tablet or smartphone, a vehicle 3D head-up display (HUD), and the like, to track eyes of a user using an infrared (IR) camera and output coordinates of positions of the tracked eyes. The example embodiments may be configured, for example, in a form of a software algorithm in a chip of a monitor, an application in a tablet or a smartphone, and a hardware eye tracking apparatus. The example embodiments may also be applicable to, for example, an autonomous driving vehicle, an intelligent vehicle, a smartphone, a mobile device, and the like. Hereinafter, the example embodiments will be described in detail with reference to the accompanying drawings, and like reference numerals in the drawings refer to like elements throughout.

FIG. 1 is a diagram illustrating an example of erroneous eye tracking. FIG. 1 illustrates image frames 110, 120, and 130 obtained by capturing an image of a user, and a detection box 125 from which an eye region and a nose region of the user are to be detected.

Referring to FIG. 1, after failing to track the eyes of the user in the image frame 110, an eye tracker detects the eye region and the nose region of the user using the detection box 125 in the image frame 120. For example, when a face of the user moves rightwards when detecting the eye region and the nose region using the detection box 125 as described above, the eye tracker may align, in a position corresponding to the face moved rightwards, a plurality of preset points corresponding to the eye region and the nose region. However, by tracking the eyes of the user using the points aligned in the position corresponding to the face moved rightwards, eye tracking may be continuously performed on an incorrect position in each subsequent image frame. That is, when the eye tracker tracks the eyes using the points aligned previously, the eye tracking may be erroneously performed in all subsequent image frames. This is because, when the face of the user moves again to face front as shown in the image frame 130, although the detection box 125 is used to correctly detect a face region of the user, the eye tracker may continuously and erroneously track the eyes of the user by using the points aligned in the position corresponding to the face moved rightwards. That is, a general-type eye tracker may track eyes of a user only by checking a face of the user or performing a face check, and may thus not rapidly respond to a potential error in the tracking.

According to an example embodiment, it is possible to improve accuracy in eye tracking while solving an issue of continuously performing erroneous eye tracking as described above, by checking whether a correct region is tracked each time a plurality of points is aligned for eye tracking and detecting again a face region from an image frame when an incorrect region is tracked.

Figure 2:
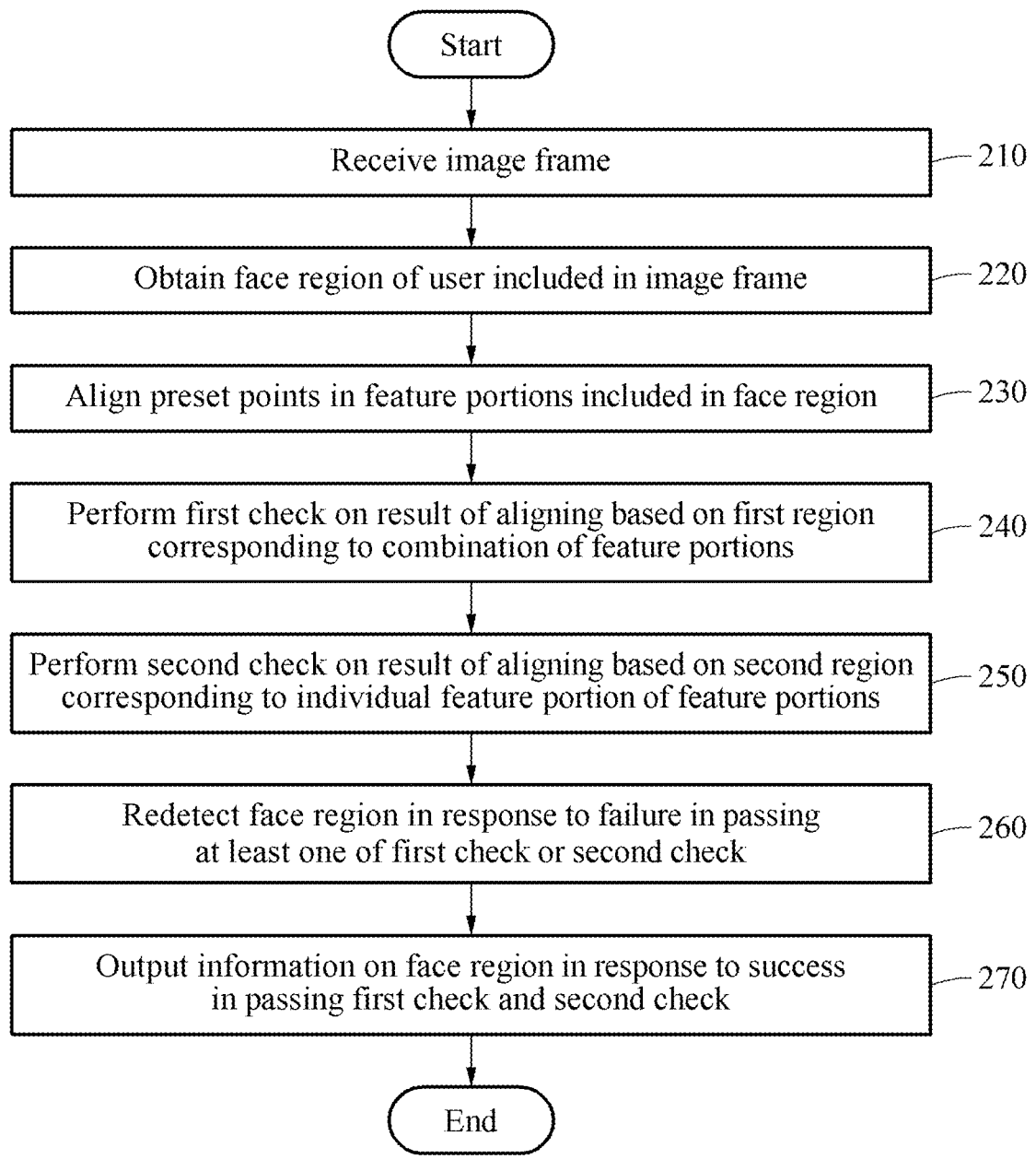
FIG. 2 is a flowchart illustrating an image processing method according to an example embodiment.

FIG. 2 is a flowchart illustrating an image processing method according to an example embodiment. The image processing method to be described hereinafter may be performed by an image processing apparatus. Referring to FIG. 2, in operation 210, the image processing apparatus receives an image frame. The image frame may be, for example, a color image frame and an IR image frame.

In operation 220, the image processing apparatus obtains a face region of a user included in the image frame. For example, when the image frame received in operation 210 is an image frame initially received by the image processing apparatus, or an initial image frame, the image processing apparatus may obtain the face region by detecting the face region of the user included in the initial image frame. However, when the image frame is not the initial image frame, the image processing apparatus may receive a face region detected based on one of previous image frames of the image frame, and thus obtain the face region.

In operation 230, the image processing apparatus aligns a plurality of preset points in a plurality of feature portions included in the face region. For example, the plurality of preset points may be 11 keypoints indicating main facial features, for example, eyes and a nose of the user. The plurality of points is indicated as dots (●) or asterisks (*) in the accompanying FIGS. 4, 5A, 5B and 6. In addition, the plurality of feature portions may be some portions or areas included in the face region of the image frame and include, for example, lips, eyebrows, eyeglasses, and the like, in addition to the eyes and the nose. The image processing apparatus may align the points in a plurality of feature portions included in the face region and a surrounding region of the face region. The image processing apparatus may move the points to be aligned in the feature portions based on image information of the face region.

The image processing apparatus may recognize positions of the feature portions corresponding to the eyes and the nose of the user from the face region of the image frame, using, for example, a supervised descent method (SDM) of aligning points with an image shape using a descent vector learned from an initial shape, an active shape model (ASM)-based method of aligning points based on a principal component analysis (PCA) to analyze a shape and principal components of the shape, an active appearance model (AAM)-based method, and a constrained local model (CLM)-based method. The image processing apparatus may move the points to the recognized positions of the feature portions to align the points in the positions. For example, when the image frame is the initial image frame, the points before being aligned may correspond to average positions of feature portions of a plurality of users. In this example, each of the points before being aligned may correspond to an average value of coordinates of positions of corresponding feature portions of the users. However, when the image frame is not the initial image frame, the points before being aligned may correspond to points aligned based on a previous image frame.

In operation 240, the image processing apparatus performs a first check on a result of the aligning based on a first region corresponding to a combination of the feature portions. The first region may include, for example, regions of the eyes, the nose, the lips, the eyeglasses, and the like. However, the first region is not limited to the examples described in the foregoing. The image processing apparatus may check whether the first region includes the combination of the feature portions, for examples, the eyes and the nose, based on image information of the first region. The image processing apparatus may check whether the first region corresponds to a class corresponding to the combination of the feature portions based on the image information of the first region. The class corresponding to the combination of the feature portion may be, for example, the face of the user. The image processing apparatus may check whether the first region corresponds to such a face class using a first checker based on, for example, a scale-invariant feature transform (SIFT) feature. For example, when 11 points corresponding to keypoints indicating eyes and a nose of each face stored in a training image database (DB) are aligned in a face region of a training image frame, the first checker may be a classifier trained with a SIFT feature extracted from each of the aligned points. The first checker may check whether the face region in which the points are aligned corresponds to an actual face class based on image information of the face region of the image frame. The first checker may be, for example, a support vector machine (SVM) classifier. The first checker may also be referred to as a face checker because it is configured to firstly check an alignment in the face region.

The SIFT feature may be obtained through the following two stages. The image processing apparatus may extract candidate feature points with a locally maximum or minimum image brightness from a scale space of an image pyramid representation of image data of the first region, and perform filtering on a feature point with a low contrast range and select a feature point to be used for image matching. The image processing apparatus may obtain an orientation component based on a gradient of a surrounding region of the selected feature point and reset a region of interest (ROI) based on the obtained orientation component, detect a size of the feature point, and generate a descriptor. The descriptor may correspond to the SIFT feature.

In operation 250, the image processing apparatus performs a second check on the result of the aligning based on a second region corresponding to an individual feature portion of the feature portions. The second region may include, for example, the region of the eyes, the nose, or the eyeglasses. However, the second region is not limited to the examples described in the foregoing. The image processing apparatus may check whether the second region corresponds to the individual feature portion based on image information of the second region. The image processing apparatus may check whether the second region corresponds to a class corresponding to the individual feature portion based on the image information of the second region. For example, the image processing apparatus may check whether the second region corresponds to an eye class using a second checker based on a SIFT feature of the second region. For example, when three points corresponding to a keypoint indicating each eye stored in the training image DB are aligned in an eye region of a training image frame, the second checker may be a classifier trained with a SIFT feature extracted from each of the aligned points. The second checker may check whether the eye region in which the points are aligned corresponds to an actual eye class based on image information of the eye region of the image frame. The second checker may be, for example, an SVM classifier. The second checker may also be referred to as an eye checker because it is configured to secondly check an alignment in the eye region.

In operation 260, the image processing apparatus redetects a face region in response to a failure in passing at least one of the first check or the second check. The image processing apparatus may then repetitively perform operations 230, 240, and 250 based on the face region redetected in operation 260.

In operation 270, the image processing apparatus outputs information on the face region in response to a success in passing the first check and the second check. For example, the image processing apparatus may output information on, for example, a position of a pupil included in the face region, a viewpoint based on the position of the pupil, a facial expression in the face region, and the like. The image processing apparatus may explicitly or implicitly output the information on the face region in operation 270. Herein, the explicit output of the information on the face region may include displaying, on a display or screen, the position of the pupil included in the face region and/or the facial expression in the face region, and/or outputting the information through an audio output. The implicit output of the information on the face region may include, for example, adjusting an image to be displayed on an HUD by the position of the pupil included in the face region and the viewpoint based on the position of the pupil, or providing a service corresponding to the facial expression in the face region.

Figure 3:
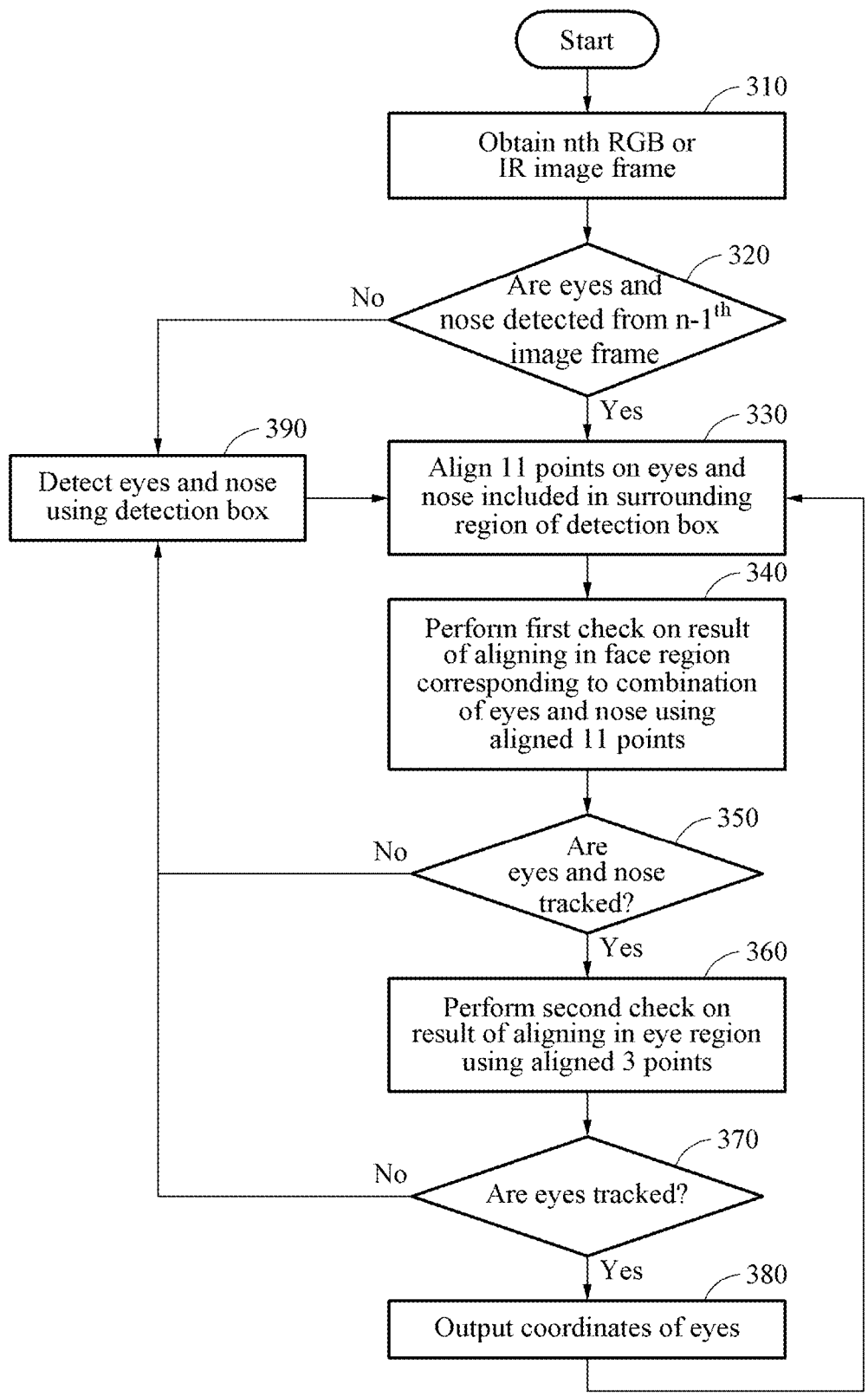
FIG. 3 is a flowchart illustrating an image processing method according to another example embodiment.

FIG. 3 is a flowchart illustrating an image processing method according to another example embodiment. The image processing method to be described hereinafter may be performed by an image processing apparatus. Referring to FIG. 3, in operation 310, an image processing apparatus obtains an $n^{th}$ image frame from a camera, where n may be an integer. The image frame may be, for example, a red, green, and blue (RGB) color image frame, or an IR image frame.

In operation 320, the image processing apparatus determines whether eyes and a nose are detected from a previous $n-1^{th}$ image frame. In operation 390, in response to a determination made in operation 320 that the eyes and the nose are not detected, the image processing apparatus detects the eyes and the nose using a detection box.

In operation 330, in response to a determination made in operation 320 that the eyes and the nose are detected, the image processing apparatus aligns feature points in a plurality of feature portions, for example, the eyes and the nose, included in a surrounding region of the detection box. According to an example embodiment, there may be 11 points that constitute the feature points. The 11 points may include, for example, three points of each of the eyes, one point of a tip of the nose, and three points of lips (or three points of the nose).

In operation 340, the image processing apparatus performs a first check on a result of the aligning in a face region corresponding to a combination of the eyes and the noise using the aligned features points.

In operation 350, the image processing apparatus determines whether the eyes and the nose are tracked in the face region as a result of the first check. In operation 390, in response to a determination made in operation 350 that the eyes and the nose are not tracked, the image processing apparatus detects the eyes and the nose using the detection box.

In general, a speed at which an object, for example, a face region, is detected may be less than or equal to 20 milliseconds (ms), and a speed at which the object is tracked may be less than or equal to 3 ms. Thus, the object detection speed may be significantly slower than the object tracking speed. According to an example embodiment, an image processing speed may be improved by performing again object detection only when object tracking fails, without performing again the object detection once the object tracking is successful.

In operation 360, in response to a determination made in operation 350 that the eyes and the nose are detected, the image processing apparatus performs a second check on the result of the aligning in the eye region using the aligned three points.

In operation 370, the image processing apparatus determines whether the eyes are detected as a result of the second check. In operation 390, in response to a determination made in operation 370 that the eyes are not detected, the image processing apparatus detects the eyes and the nose using the detection box.

In operation 380, in response to a determination made in operation 370 that the eyes are detected, the image processing apparatus outputs coordinates of the eyes or coordinates of pupils.

Figure 4:
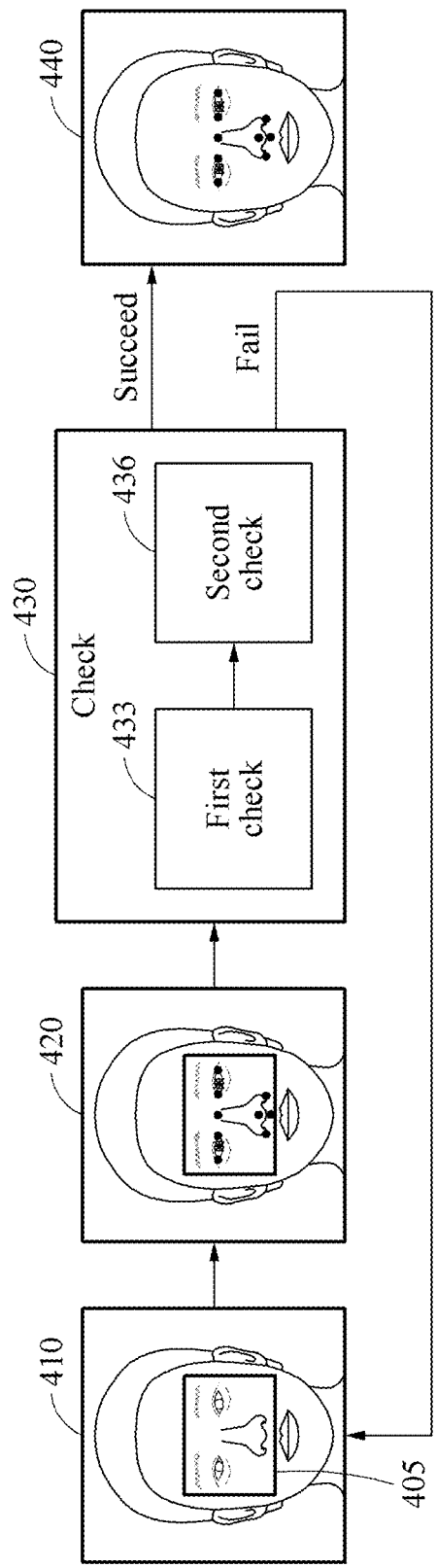
FIG. 4 is a diagram illustrating an example of how information on a face region is output according to an example embodiment.

FIG. 4 is a diagram illustrating an example of how information on a face region is output according to an example embodiment. Referring to FIG. 4, in operation 410, when an image processing apparatus receives an image frame from a camera, the image processing apparatus detects eyes and a nose from the image frame using a detection box 405 used to detect a face region including a region of the eyes and the nose.

In operation 420, the image processing apparatus aligns a plurality of points in the eyes and the nose within a surrounding region of the detection box 405, the surrounding region including the detection box 405.

In operation 430, the image processing apparatus checks a result of the aligning based on the aligned points. In detail, in operation 433, the image processing apparatus performs a first check to check whether points corresponding to the eyes and the nose among the aligned points are aligned in positions of eyes and a nose in an actual image frame. For example, the image processing apparatus may obtain a shape indicated by the aligned points in the face region. The image processing apparatus may perform the first check to determine whether the points are aligned in a face using image information of a surrounding region of a region corresponding to the shape. Subsequently, in operation 436, the image processing apparatus performs a second check to check whether points corresponding to the eyes among the aligned pints are aligned in the position of the eyes in the actual image frame.

In response to a failure in passing any one of the first check and the second check in operation 430, the image processing apparatus detects the eyes and the nose from a subsequent image frame using the detection box 405 in operation 410.

In response to a success in passing both the first check and the second check in operation 430, the image processing apparatus extracts positions of pupils from the aligned points in operation 440.

Figure 5A:
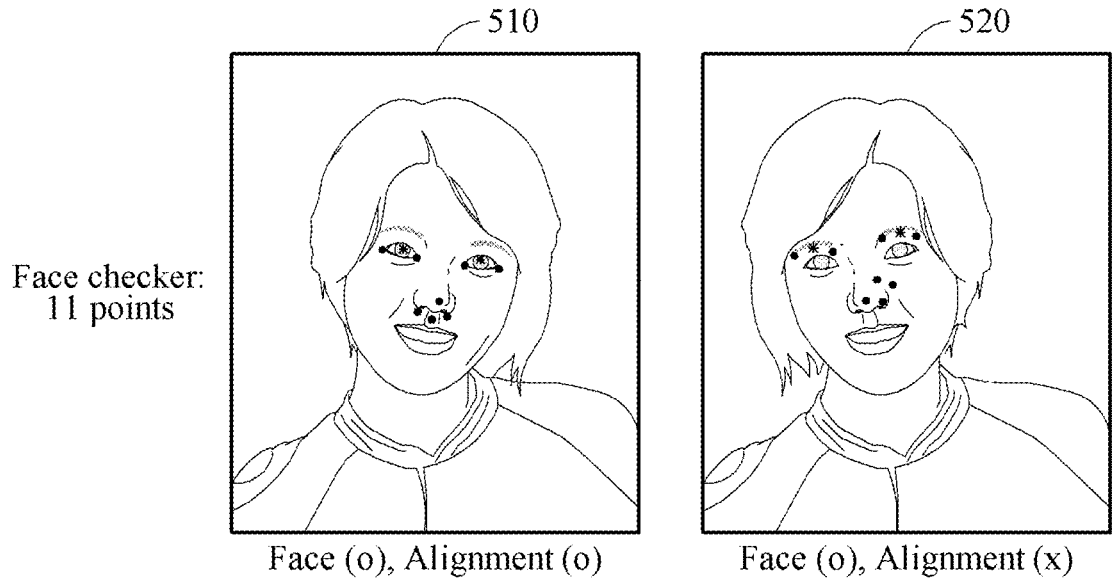
FIGS. 5A and 5B are diagrams illustrating examples of results obtained by a first checker and a second checker according to an example embodiment.
Figure 5B:
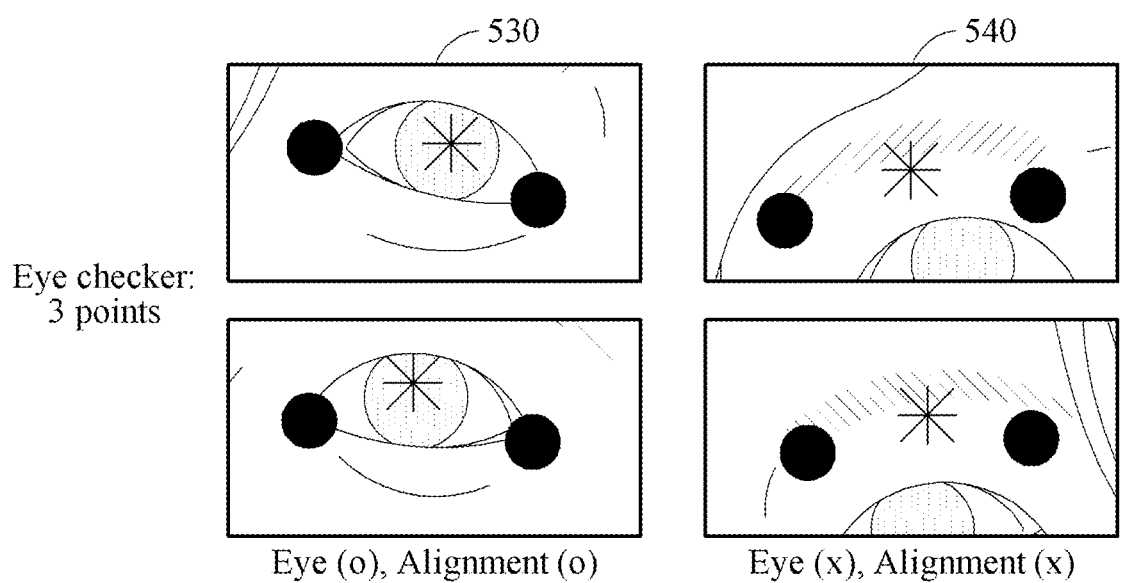

FIGS. 5A and 5B are diagrams illustrating examples of results obtained by a first checker and a second checker according to an example embodiment. FIG. 5A illustrates a result of aligning preset 11 points in a plurality of feature portions, for example, eyes and a nose, included in a face region of an image frame.

As described above, a first checker, or a face checker, checks whether the 11 points are aligned in the eyes and the nose in the image frame as shown in an image 510, or are not correctly aligned in the eyes and the nose in the image frame as shown in an image 520 although the 11 points are aligned in the face region of the image frame.

FIG. 5B illustrates a result of aligning three points corresponding to an eye among the preset 11 points in an individual feature portion, for example, the eye, included in the image frame.

As described above, a second checker, or an eye checker, determines whether the three points are aligned in the eye in the face region of the image frame as shown in an image 530, or whether the three points are not correctly aligned in the eye in the face region of the image frame as shown in an image 540 although the three points are positioned in a region of the eye in the image frame.

According to an example embodiment, through such two-step tracking check using the face checker and the eye checker, it is possible to improve a stability and accuracy in overall eye tracking by improving accuracy in face detection and accuracy in eye alignment using a plurality of points aligned in an image frame.

According to an embodiment, the first check may include determining whether a combination of a plurality of feature portions in a first region satisfies a first criterion, and the second check may include determining whether one or more of the plurality of feature portions individually satisfies a second criterion. Further, based on a determination that the combination of the plurality of feature portions in the first region does not satisfy the first criterion the face may be redetected. Otherwise, based on a determination that the combination of the plurality of feature portions in the first region satisfies the first criterion and the one or more of the plurality of feature portions individually satisfies the second criterion information on the face region may be output.

According to an embodiment, the first criterion may be whether a plurality of feature points (i.e., 11 points) are aligned in the eyes and the nose in the image frame. According to an embodiment, the second criterion may be whether one or more points, among the plurality of features points, (i.e., 3 points) are correctly aligned in the eye in the face region of the image frame. According to an embodiment, the first criterion may correspond to characteristics of a face and the second criterion may correspond to characteristics of an eye.

Figure 6:
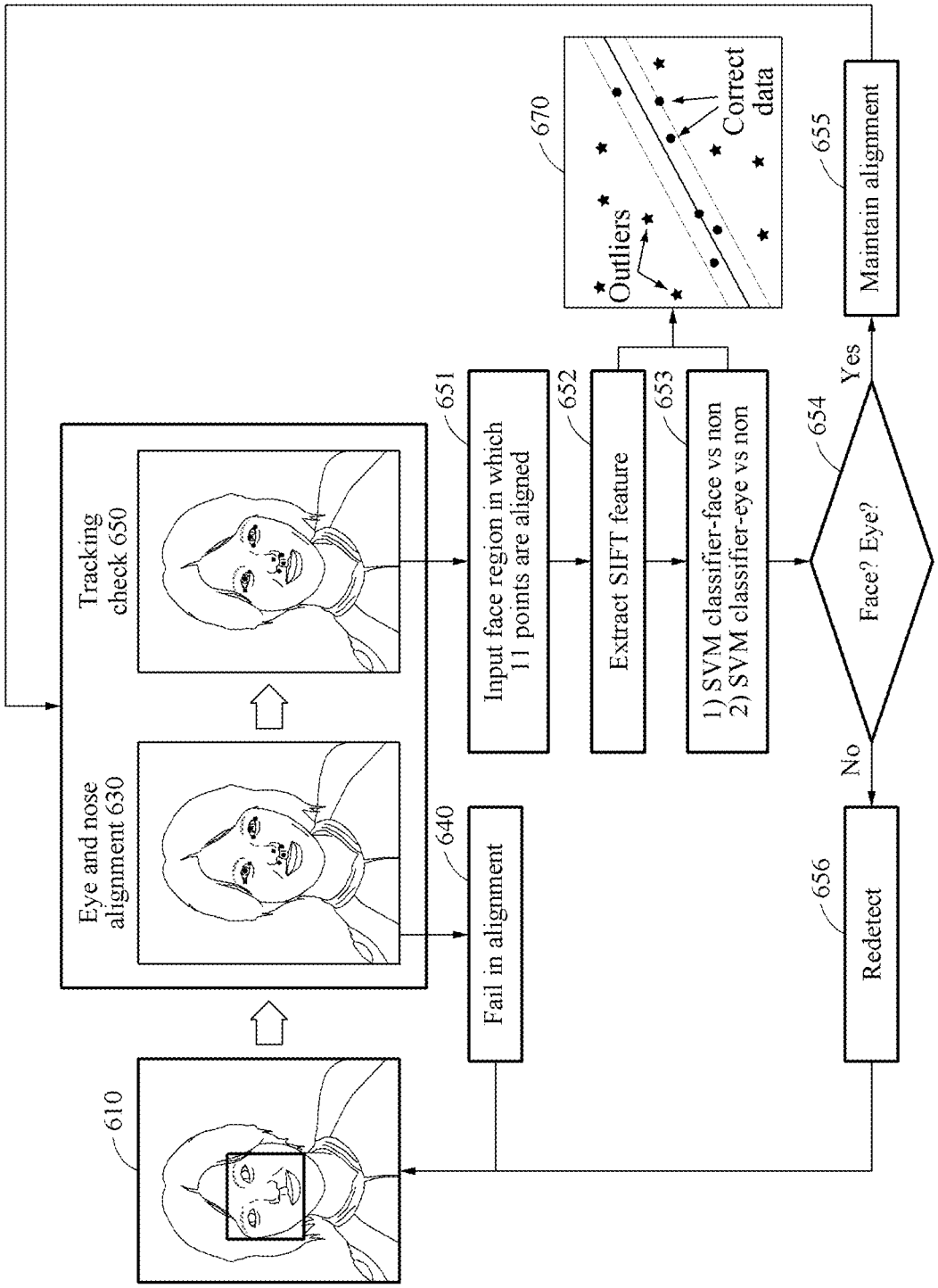
FIG. 6 is a diagram illustrating an example of an image processing method according to an example embodiment.

FIG. 6 is a diagram illustrating an example of an image processing method according to an example embodiment. Referring to FIG. 6, in operation 610, an image processing apparatus detects a face region of a user including eyes and a nose using a detection box from each image frame of a camera. The image processing apparatus then performs tracking without additional detection unless alignment and/or tracking fails.

In operation 630, the image processing apparatus aligns a plurality of preset points in the eyes and the nose included in the face region. In response to a failure in the aligning in operation 630, the image processing apparatus detects a face region of the user including the eyes and the nose from a new image frame in operation 610. In response to a success in the aligning in operation 630, the image processing apparatus performs a two-step tracking check in operation 650. The two-step tracking check is performed as follows.

When the face region in which 11 points are aligned is input in operation 651, the image processing apparatus extracts a SIFT feature of the aligned points in operation 652.

In operation 653, the image processing apparatus checks a result of face alignment and eye alignment based on the SIFT feature extracted in operation 652 using an SVM classifier trained with tens of thousands of images in an image DB.

In operation 653, the image processing apparatus performs a first tracking check on a face using a face checker described above. The face checker is configured to check whether the face region in which points are aligned corresponds to an actual face, using image information of the face region of the image frame.

In operation 653, the image processing apparatus performs a second tracking check on an eye using an eye checker described above. The eye checker is configured to check whether an eye region in which points are aligned corresponds to an actual eye using image information of the eye region of the image frame.

Through the two-step tracking check performed in operation 653, the image processing apparatus may correct a potential error in tracking in early stage by removing misalignment outliers as illustrated by 670 in FIG. 6.

Figure 7:
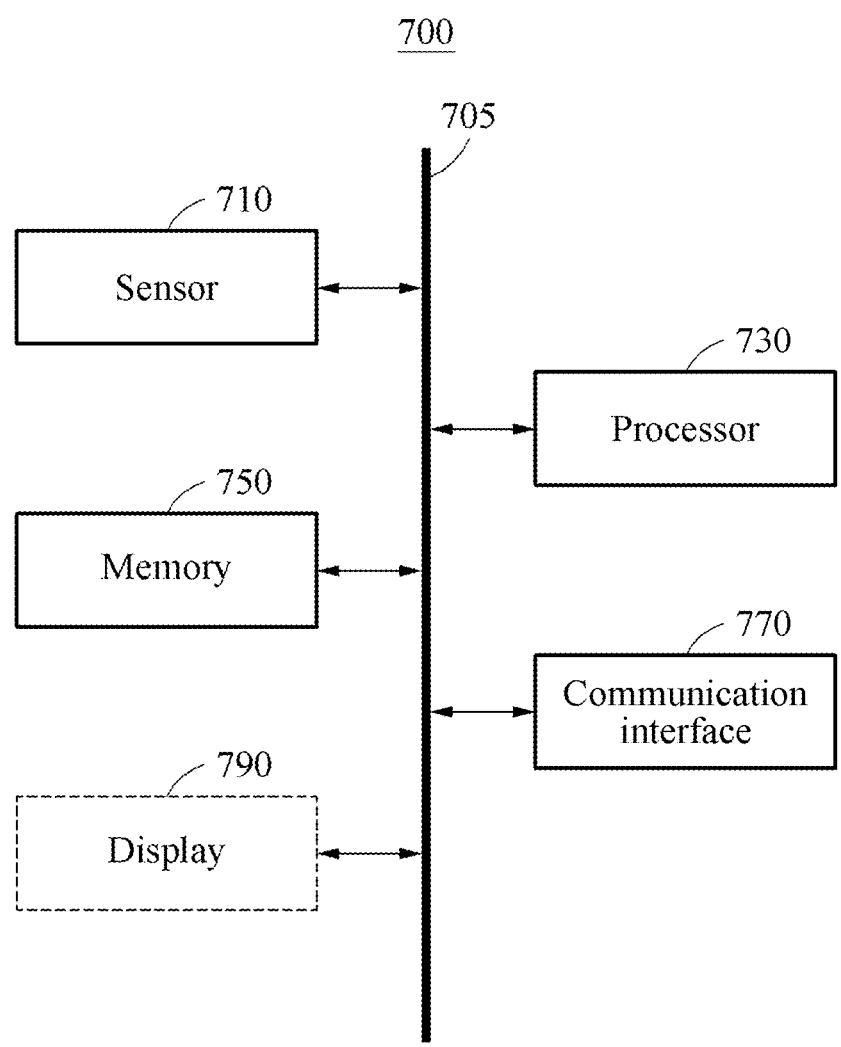
FIG. 7 is a diagram illustrating an image processing apparatus according to an example embodiment.

FIG. 7 is a diagram illustrating an image processing apparatus according to an example embodiment. Referring to FIG. 7, an image processing apparatus 700 includes a sensor 710, a processor 730, a memory 750, a communication interface 770, and a display 790. The sensor 710, the processor 730, the memory 750, the communication interface 770, and the display 790 may communicate with each other through a communication bus 705. According to another example embodiment, an image processing apparatus may not include a display 790. However, the image processing apparatus may be configured to communicate with a display.

The sensor 710 may sense an image frame. The sensor 710 may be, for example, an image sensor, a vision sensor, or an IR camera, which capture an input image by an IR illumination. The image frame may be, for example, an image of a face of a user, or an image of a vehicle traveling.

The processor 730 may obtain a face region of the user included in the image frame. The processor 730 may align a plurality of preset points in a plurality of feature portions included in the face region. The processor 730 may perform a first check on a result of the aligning based on a first region corresponding to a combination of the feature portions. The processor 730 may perform a second check on the result of the aligning based on a second region corresponding to an individual feature portion among the feature portions. In response to a failure in passing at least one of the first check or the second check, the processor 730 may redetect a face region.

The processor 730 may perform at least one the methods described above with reference to FIGS. 1 through 6, or algorithms corresponding to the methods. The processor 730 may execute a program and control the image processing apparatus 700. A program code of the program to be executed by the processor 730 may be stored in the memory 750. The processor 730 may be configured by, for example, a central processing unit (CPU) and a graphics processing unit (GPU).

The memory 750 may store the image frame, the face region of the user obtained by the processor 730, information on the face region, and the like. The memory 750 may be a volatile or nonvolatile memory.

The communication interface 770 may receive the image frame. In response to a success in passing the first check and the second check, the communication interface 770 may output the information on the face region. According to an example embodiment, the communication interface 770 may receive an image frame captured by an external source of the image processing apparatus 700, or information from various sensors received from outside of the image processing apparatus 700.

The display 790 may display a processing result of the processor 730. For example, in a case in which the image processing apparatus 700 is embedded in a vehicle, the display 790 may be configured by a HUD installed in the vehicle.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

Example embodiments include non-transitory computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts.

Examples of non-transitory computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random-access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

While this disclosure includes specific examples, it will be apparent to one of ordinary skill in the art that various changes in form and details may be made in these examples without departing from the spirit and scope of the claims and their equivalents.

What is claimed is:

1. An image processing method comprising:
   receiving a camera image;
   detecting a face region of a user in the camera image;
   tracking a face portion and an eye portion in the face portion; and
   redetecting the face region in response to the tracking of the face portion or the eye portion has fails.

2. The image processing method of claim 1, wherein the tracking comprises:
   aligning a plurality of feature points in a plurality of portions included in the face region; and
   tracking the face portion and the eye portion based on the result of the aligning.

3. The image processing method of claim 2, wherein the tracking comprises:
   determining whether the first region corresponds to the face portion based on image information of the plurality of feature points aligned in a first portion corresponding to the face portion among the plurality of portions; and
   tracking the face portion according to the determination that the first region corresponds to the face portion.

4. The image processing method of claim 2, wherein the tracking comprises:
   determining whether the second region corresponds to the eye portion based on image information of the plurality of feature points aligned in a second portion corresponding to the eye portion among the plurality of portions; and
   tracking the eye portion according to the determination that the second region corresponds to the eye portion.

5. The image processing method of claim 2, wherein the redetecting comprises:
   determining whether the tracking of the face or the eye has failed based on the result of the aligning.

6. The image processing method of claim 2, wherein the aligning comprises:
   aligning the plurality of feature points with the face portion and the eye portion included in the face region and a surrounding region of the face region.

7. The image processing method of claim 2, wherein the aligning comprises:
   moving the plurality of feature points based on image information in the face region.

8. The image processing method of claim 2, wherein, when the camera image is an initial image frame, the plurality of feature points before being aligned correspond to average positions of the face are and the eye portion of a plurality of users.

9. The image processing method of claim 2, wherein, when the camera image is not an initial image frame, the plurality of feature points before being aligned correspond to points aligned with the face portion and eye portion based on a previous image frame.

10. The image processing method of claim 1, wherein the detecting the face region comprises:
    detecting the face region of the user included in the camera image when the camera image being an initial image frame; and
    detecting the face region of the user based on one of previous images of the camera image when the camera image is not the initial image frame.

11. The image processing method of claim 1, further comprising:
    repetitively performing the tracking operation based on the redetected face region.

12. The image processing method of claim 1, further comprising:
    outputting information on at least one of a position of a pupil included in the redetected face region, a viewpoint based on the position of the pupil, or a facial expression in the face region.

13. A non-transitory computer-readable storage medium storing instructions that are executable by a processor to perform the image processing method of claim 1.

* * * * *